(12) United States Patent
Brotman (10) Patent No.: US 9,939,243 B2
(45) Date of Patent: Apr. 10, 2018

(54) ADHESIVE MEASURING TAPE (71) Applicant: Harris F Brotman, La Jolla, CA (US)

(72) Inventor: Harris F Brotman, La Jolla, CA (US)

( * ) Notice: Subject to any disclaimer, the term of this patent is extended or adjusted under 35 U.S.C. 154(b) by 0 days.

(21) Appl. No.: 13/838,302

(22) Filed: Mar. 15, 2013

(65) Prior Publication Data

US 2014/0109425 A1  Apr. 24, 2014

Related U.S. Application Data

(60) Provisional application No. 61/718,086, filed on Oct. 24, 2012.

(51) Int. Cl.
*G01B 3/10* (2006.01)
(52) U.S. Cl.
CPC ........ *G01B 3/10* (2013.01); *G01B 2003/1089* (2013.01); *G01B 2003/1097* (2013.01)
(58) Field of Classification Search
CPC ........................................................ G01B 3/10
USPC .................................................... 33/758, 512
See application file for complete search history.

(56) References Cited

U.S. PATENT DOCUMENTS

| 1,974,085 | A | * | 9/1934 | Shields et al. | 33/512 |
| 1,996,553 | A | * | 4/1935 | Scully | 33/512 |
| 2,026,768 | A | * | 1/1936 | Aronson | 33/27.03 |
| 3,313,030 | A | * | 4/1967 | Heys | 33/512 |
| 4,118,868 | A | * | 10/1978 | Johnson | 33/512 |
| 6,073,359 | A | * | 6/2000 | Lee | 33/759 |
| 6,637,124 | B2 | * | 10/2003 | Pederson | 33/758 |
| 7,155,838 | B2 | * | 1/2007 | Leyden et al. | 33/492 |
| 7,181,861 | B1 | * | 2/2007 | Leser | 33/832 |
| 7,475,487 | B1 | * | 1/2009 | Johnson | 33/512 |
| 7,581,333 | B2 | * | 9/2009 | Dressler | 33/758 |
| 2005/0257393 | A1 | * | 11/2005 | Spanski et al. | 33/758 |
| 2009/0172964 | A1 | * | 7/2009 | Sacks | 33/755 |
| 2010/0088915 | A1 | * | 4/2010 | Neff | 33/759 |
| 2010/0223799 | A1 | * | 9/2010 | Dunham | 33/512 |
| 2012/0096726 | A1 | * | 4/2012 | Glock, Jr. | 33/512 |
| 2014/0202017 | A1 | * | 7/2014 | Wood | 33/512 |

FOREIGN PATENT DOCUMENTS

GB   2155406 A * 9/1985

* cited by examiner

*Primary Examiner* — Christopher Fulton
(74) *Attorney, Agent, or Firm* — Harris F. Brotman

(57) ABSTRACT

An adhesive-backed flexible backing, comprising a measuring tape and a receptacle for holding a writing instrument positioned or disposed on one end of said tape. Another end of the backing has a display surface area.

4 Claims, 6 Drawing Sheets

Fig. 1

Prior Art

ADHESIVE MEASURING TAPE

This application takes priority from U.S. Provisional Application 61/718,086.

BACKGROUND

It has been common practice for many, many years for parents to record the physical growth of their children by having the child stand against a wall and marking the child's height and the date associated therewith on the wall or door frame. This has certain advantages in that it is essentially a permanent record, but, disadvantageously, the record stays with the wall or door frame and may either be painted over when the house is redecorated or stays with the house when the family moves to a new dwelling, which in both cases results in the loss of the records.

An object of the invention is the provision of a repositionable and erasable adhesive ruler which includes a detachable storage pocket or receptacle for receiving a marking instrument.

It is another object of the invention to provide a combination tape measure and writing or marking instrument.

Another object of the invention overcomes the disadvantage of leaving behind a record of a child's growth as marked on a wall or non-removable surface.

DESCRIPTION

In certain embodiments, the tape comprises a receptacle positioned or disposed on one end of said tape, and a display surface disposed on the other end. Embodiments of the display surface include an extension of said end, the length of which may be as short as a fraction of an inch to a length equal to or less than the length of the measuring tape. The width of said extension can be the same or less than the measuring tape. Further embodiments of the display surface include surfaces selected from the group of shapes consisting of quadrilaterals, triangles, polygons, circular, oval, round and curved, and combinations thereof.

In certain embodiments, the receptacle forms a pocket on the measuring surface. The pocket is sized for receiving and holding a writing instrument. Embodiments of the receptacle are releasably engaged or releasably attached to the respective end of the tape.

Alternatively, the receptacle has a planar shape (i.e. a receptacle blank) which bears indicia, printed and/or creased in the planar blank, along which the user folds the planar shaped blank to form or erect a receptacle.

Adhesive Measuring Tape

The present invention comprises a first an adhesive backed, flexible tape. U.S. Pat. No. 6,637,124, herein incorporated by reference, discloses an adhesive backed measuring tape that can provide customized, printed measurement scales on a single flexible backing of face material that has a positionable or repositionable adhesive layer for contact with flat surfaces, single curved surfaces, or compound curved surfaces.

In certain embodiments, the measuring tape has multiple scales printed thereon. The combination of linear sections and transverse axes defined by intervals can permit a variety of repeating scales on a single tape.

The adhesive-backed measuring tape is removable from finished surfaces without harm to the finished surface.

The adhesive backed measuring tape is positionable or repositionable to permit adjustment of the measurement position prior to taking the actual measurement.

As used herein, "positionable" means an adhesive or pressure sensitive adhesive surface can be placed against a substrate surface and easily slid over the surface into proper position without preadhering to the substrate; pressure is generally required to adhere the adhesive article to the substrate.

As used herein, "repositionable" means an adhesive or pressure sensitive adhesive surface can be applied and adhered to a substrate and then removed and reapplied without distorting, defacing, or destroying the backing, adhesive, or substrate; repositionable adhesives need not be positionable or vice versa.

The invention provides both numerical and color indicia for multiple measurement usage within the same length of measuring tape.

Accordingly, an aspect of the present invention is an adhesive backed measuring tape, having two major surfaces. In certain embodiments, one major surface of the adhesive-backed measuring tape comprises a layer of material apposed and attached to the backing, which forms a pocket thereon sized for receiving a marking or writing instrument. The other surface of the second segment comprises a positionable or repositionable adhesive layer.

Another aspect of the invention comprises a method of using an adhesive backed measuring tape identified above, comprising the steps of (a) dispensing the measuring tape from a roll; (b) applying the measuring tape to a substrate; and (c) removing the measuring tape from the substrate.

Another aspect of the invention is an adhesive backed measuring tape, comprising (a) a backing 12 having two major surfaces, wherein one major surface has a measurement layer 14 printed or contacted thereon, wherein the measurement layer has a multiple of linear axes and a multiple of transverse axes, wherein each linear axis represents a linear segment of the measuring tape which is a function of the number transverse axes, and (b) an adhesive layer 16 adhered to the other major surface of the backing or to the measurement layer.

A feature of the invention is the use of commercially useful positionable or repositionable adhesives on flexible substrates to permit adjustment to measurements or repeatable measurements without harm to the underlying substrate.

Another feature of the invention involves an embodiment which has linear axes along the same measuring tape to provide differing information.

Certain preferred embodiments employ the use of a multiple numerical scales and colored indications which can be customized for use in particular industries or crafts based on key measurements that are common to that industry or craft.

The starting point for use of the measuring tape can exist at any linear axis employed along the measuring tape.

Another advantage of the invention is the ability to use convenient printing techniques during manufacture of the measuring tape to provide customized measuring tapes for particular businesses within given industries or crafts to publicize and promote that business within the industry or craft.

An adhesive backed measuring tape can be embodied in a variety of lengths, widths, graduations, colors and materials to suit the needs of the specific application. A preferred embodiment is a ruler tape which is has a release liner on the adhesive back with a peel and stick application.

The rulers are adhesive backed and can be mounted to most surfaces including steel, aluminum, hard plastics, glass and wood.

The tape of the invention can be formed in widths ranging from ¼ " to 24 inches. One set of embodiments has a width which can be in the range of about 1 inch to about 6 inches. The width is appropriate for the specific application; and made in a variety of lengths and colors. In certain applications, the width provides sufficient space for written notation.

The adhesive is coated on one side of the measuring tape. The other side of the adhesive is laminated to a backing 25, i.e. a release liner.

For proper installation remove or peel off the release liner 25 from the adhesive 16. Without touching the adhesive, place the measuring type in the desired location.

The adhesive measuring tape may be termed an adhesive ruler tape or adhesive tape measure.

The face materials, adhesives, and release liners can be formed from a wide variety of materials known to those skilled in the art. PANDUIT® Adhesive Backed Mounts and Devices.

Adhesive tapes of the invention typically comprise three laminated components (FIG. 1): the backing or face material 12 coated on one major surface with adhesive 16 and a release liner 25 positioned on the adhesive. As described herein, a layer of material 30 is laminated on top of the face material 12 thereby forming a pocket 35 positioned thereon.

Face Materials.

The Face Material 12 is the carrier or backing which is commonly coated on one side with adhesive 16 and usually printed on the other side. Face Material can be a wide variety of papers, films, fabric, foils, etc. The Face Material will affect the types of ink that will print well on them.

Adhesives

An adhesive, or glue, is a mixture in a liquid or semi-liquid state that adheres or bonds items together. Adhesives 16 are coated on one side of the Face Material 12.

Especially preferred among the adhesives are those adhesives which are aggressive, removable, positionable or repositionable or both, and have low tack.

It is an advantage of the present invention that a variety of adhesives can be selected to be use with a variety of methods of printing of the measurement scale on a variety of backings 12, such that one those skilled in the art can tailor a particular type of tape for use with particular substrates.

Release Liners.

A Release liner 25 is a paper or plastic based carrier web material, which is coated on one or two sides with a release agent, which provides a release effect against any type of a sticky material such as an adhesive or a mastic. Release liners are available in different colors, with or without printing under the silicone or on the backside of the liner. Release is separation of the liner from a sticky material 16. A liner is the carrier for the release agent.

| NON-LIMITING EXAMPLES OF MATERIALS |
|---|
| Paper Based Face Material |
| aluminum foil |
| art card |
| art paper |
| bar code card |
| check book paper |
| fluorescent paper |
| metalized/silver/gold foil |
| inkjet paper |
| kraft paper |
| laser printing paper |
| masking paper |
| mirrorkote paper/cast coated paper |
| printing paper |
| security seal paper |
| tag paper |
| thermal paper |
| tissue paper |
| vellum paper |
| Security face material |
| Destructive PVC/brittle label |
| Security seal paper |
| Tissue destructive paper |
| Tissue paper |
| Void security paper |
| Void |
| Woven based face material |
| White satin |
| Polyester satin |
| Nylon polyester satin |
| Release Liner |
| Kraft double sided release liner |
| Glassine release liner |
| Kraft release liner |
| Adhesive |
| Hot melt |
| Super-permanent |
| Permanent |
| Semi-permanent |
| Removable Ultra-removable |
| Film Based Face Material |
| Acetate |
| Car pvc |
| Destructive pvc/brittle label |
| Hologram |
| Materlise transfer |
| Opp |
| Opp lamination |
| Opp printing |
| Polyester |
| Polyester void |
| Polyethylene |
| Pvc |
| Thermal yupo |
| Transparent opp |
| Transparent opp tape |
| Tyvek paper |
| yupo |
| Thermal face material |
| Thermal yupo |
| Direct thermal paper |

Embodiments of the measuring tape of the invention can be scaled in a variety of ways. Non-limiting examples include Fractional (inches & feet), Metric (cm, mm, & m), Fractional-Metric (inches & centimeters), Centering (centers at zero), Half Scale (1"=2" and 1 cm=2 cm)

Measuring Tape Construction

Alternate embodiments of an adhesive-backed flexible backing of the present invention may be distinguished by the location of the functional layers of the measuring tape.

Figure 1:
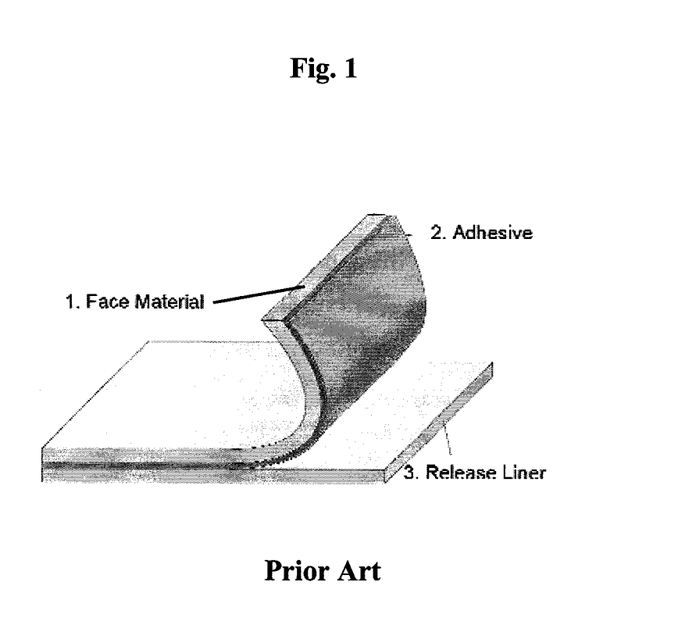
FIG. 1 illustrates prior art lamination of release-liner backed adhesive tape.

Elements of the adhesive backed flexible backing of the invention the tape of the present invention are illustrated in U.S. Pat. No. 6,637,124 (the '124 patent, incorporated by reference herein). As shown in FIG. 1 of the '124, tape 10 has a polymeric tape backing 12 having two major opposing surfaces, one of which has a measurement scale layer 14 printed or contacting backing 12 and the other having a layer 16 of pressure sensitive adhesive.

Depending on the composition and properties of the measurement layer 14, adhesive layer 16 may need an optional release liner in order to protect the adhesive prior to use and especially in those embodiments when tape is rolled upon itself. Preferably, printed layer 14 has sufficient properties to permit release of adhesive layer 16 if tape 10 is stored in a rolled fashion, more preferably in a container suitable for storing or dispensing for conveniently unrolling tape 10 along the substrate to be measured.

U.S. Pat. No. 6,637,124 (FIG. 2 therein) shows tape 20 composed of a backing 22 having two opposing major surfaces, wherein one of the major opposing surfaces has both a layer of measurement scale 24 and, on top of layer 24, a layer 26 of pressure sensitive adhesive. Tape 20 is particularly suitable for measurement of translucent or transparent materials where it is desired to have the measurement device on the opposite side from the location where measurement is desired. For example, in the manufacture of backlit signage, the assembly of colored pieces of translucent films on to a transparent or translucent surface may not permit the measuring tape to be adhered at the same location as the placement of the pieces of colored film. Use of a tape 20, conveniently called a "second surface" measuring tape permits measurement to be employed without interruption of the assembly of the backlit signage phase.

U.S. Pat. No. 6,637,124 (FIG. 4 therein) tape 80 wound directly upon itself in a roll form, and one major surface 82 has a measurement layer printed or contacted thereon. Depending on the composition and properties of the measurement layer 14, adhesive layer 16 may need an optional release liner (not shown) in order to protect the adhesive prior to use and especially when tape is rolled upon itself. Preferably, printed layer 14 has sufficient properties to permit release of adhesive layer 16 if tape 10 is stored in a rolled fashion, more preferably in a dispenser suitable for conveniently unrolling tape 10 along the substrate to be measured.

Nonlimiting examples of materials from which backing can be constructed include polymers having the physical properties described above which are exemplified by polyesters (PET), high density polyethylene (HDPE), polyvinylidene fluoride, polyvinyl chloride, nylon, and some sturdy paper products. Such backings may be integrally dimensionally stable (with or without tensile orientation) or can include reinforcements such as nylon filaments to achieve dimensional stability.

Measurement Layer

The present invention employs (as in U.S. Pat. No. 6,637,124) the creation of layers 14 and 24 by 4-color printing systems using the subtractive colors of cyan, magenta, yellow, and black ("CMYK" colors) to permit one skilled in the art of printing to create as many as 256 different colors or more according to the industry requirements or preferences.

Colorant used for creating layers 14 and 24 can range from pigmented particles such as included in inkjet inks, electrostatic toners used in electrographic printing dye based inks, offset web printing inks, and the like.

Surface embossing techniques can also be employed to mark physically the surface of the backing in order to provide a tactile differentiation for measurement use.

Indicia

One can add promotional or other branding indicia onto the display surface of the present invention tape during the course of the printing process of marking tape. One skilled in the art will learn what customized indicia are desired and add such markings into the printing process as needed.

Guidance for construction of certain elements of the invention herein can be found in U.S. Pat. No. 7,581,333, as well as all patents cited herein, are incorporated by reference.

Receptacle

In certain embodiments, a demarcation 40 printed, perforated, or creased, formed on an end of the tape demarcates the receptacle 35 or pocket. The demarcation may be a set of perforations, serrations or scoring to aid in dividing the receptacle from the respective end of the tape. Demarcations are suitable for cutting or slitting thereby separating or dividing the receptacle section from the tape.

In certain embodiments, a transverse axis printed, embossed, perforated, serrated or the like demarcates the receptacle from the tape.

Demarcations may comprise a plurality of imperforate depressions in the tape and projecting upwardly.

The receptacle 35 shaped as a pocket, is sized for receiving and storage of a marking instrument 20.

The pocket comprises an inner layer which may comprise the surface of the backing itself of the adhesive backed flexible backing, and an outer layer 30.

In other embodiments, the receptacle 35 comprises a receptacle blank 45 formed on one end of the measuring tape. As described above, indicia (e.g. printed and/or creased) positioned on the blank. The user folds the planar shaped blank in accord with said indicia to form or erect a receptacle. In certain embodiments, the planar receptacle blank is detachable attached to the end of the measuring tape, one or more indicia marking the position of detachment.

Figure 5:
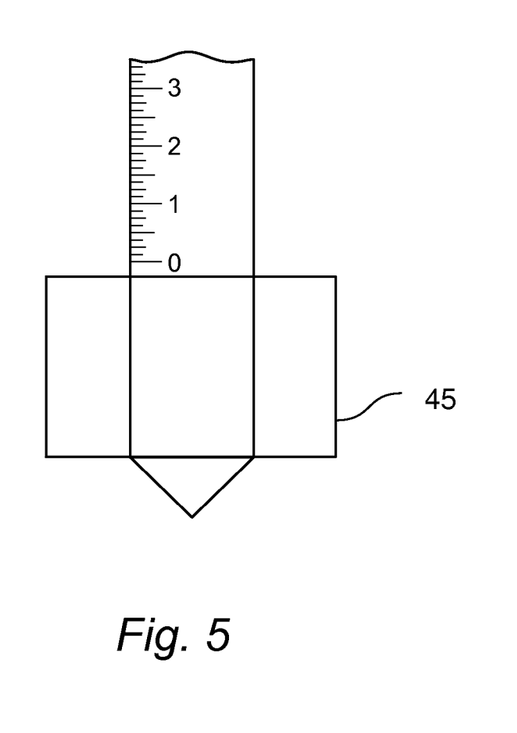
FIGS. 5 and 6 show embodiments in which a planar blank receptacle is detachably attached at one end, and two examples of display surfaces at the other end.
Figure 6:
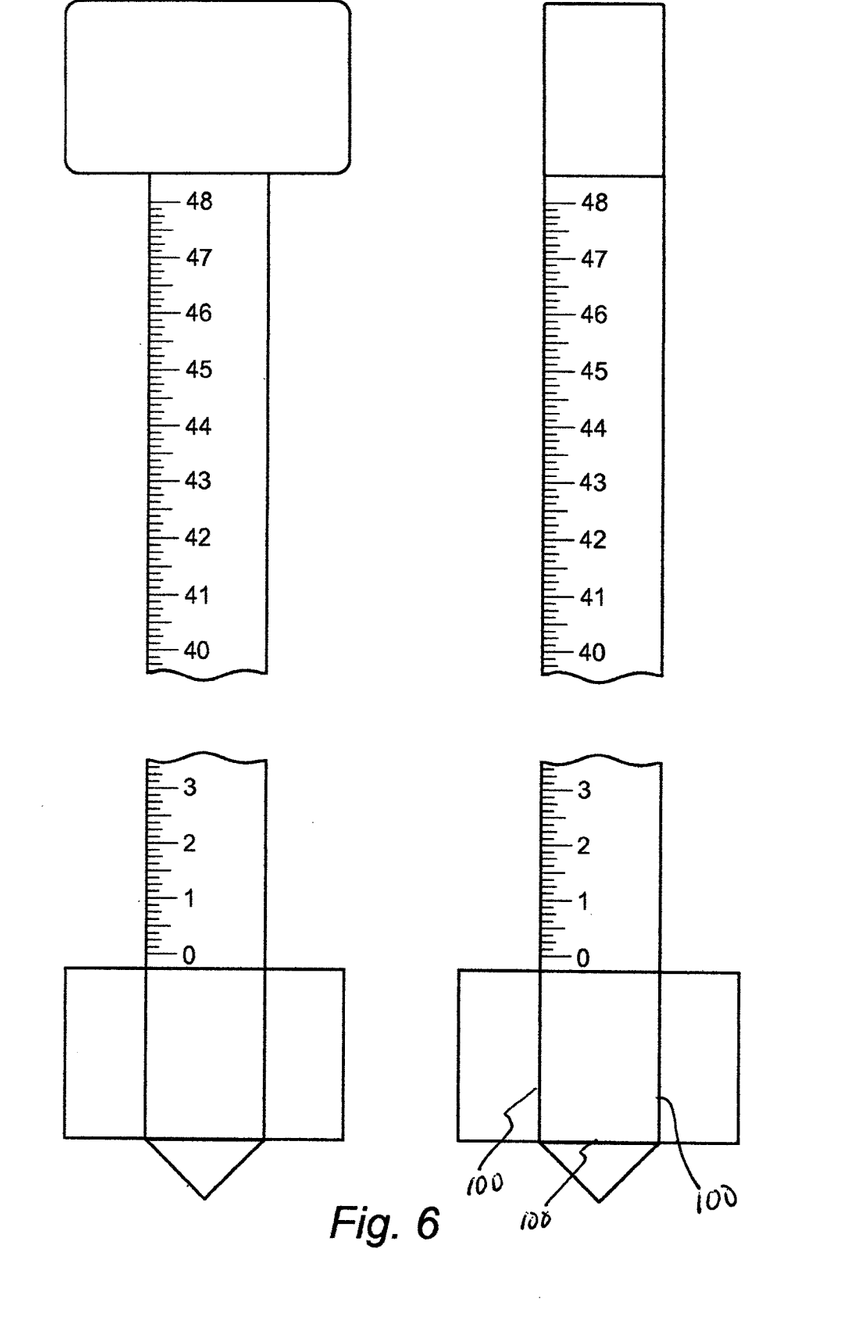

FIGS. 5 and 6 show various embodiments of the adhesive backed flexible backing of the invention with differently sized and shaped display surfaces 50 on one end and receptacle blanks 45 on the other.

Accordingly, the adhesive backed flexible backing of the invention comprises a measuring tape, and a receptacle comprising an adhesive-backed pocket 35 formed at one end thereon.

In use, the pocket (receptacle) 35 may be separated or detached from the measuring tape along the demarcation. The pocket may be independently mounted on the substrate (e.g. wall) in proximity to the measuring tape. The user may keep a marking instrument 20 in the pocket 35 for marking height measurements on the measuring tape.

Figure 2:
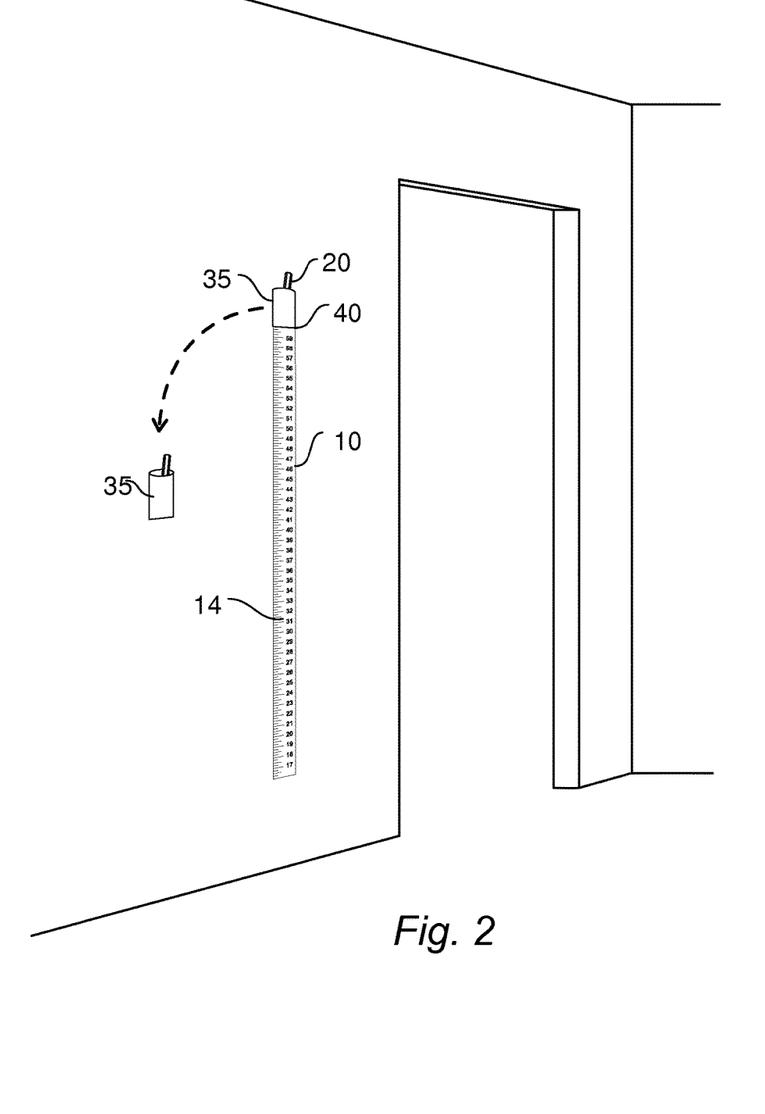
FIG. 2 shows the adhesive backed flexible backing mounted on a wall.
Figure 3:
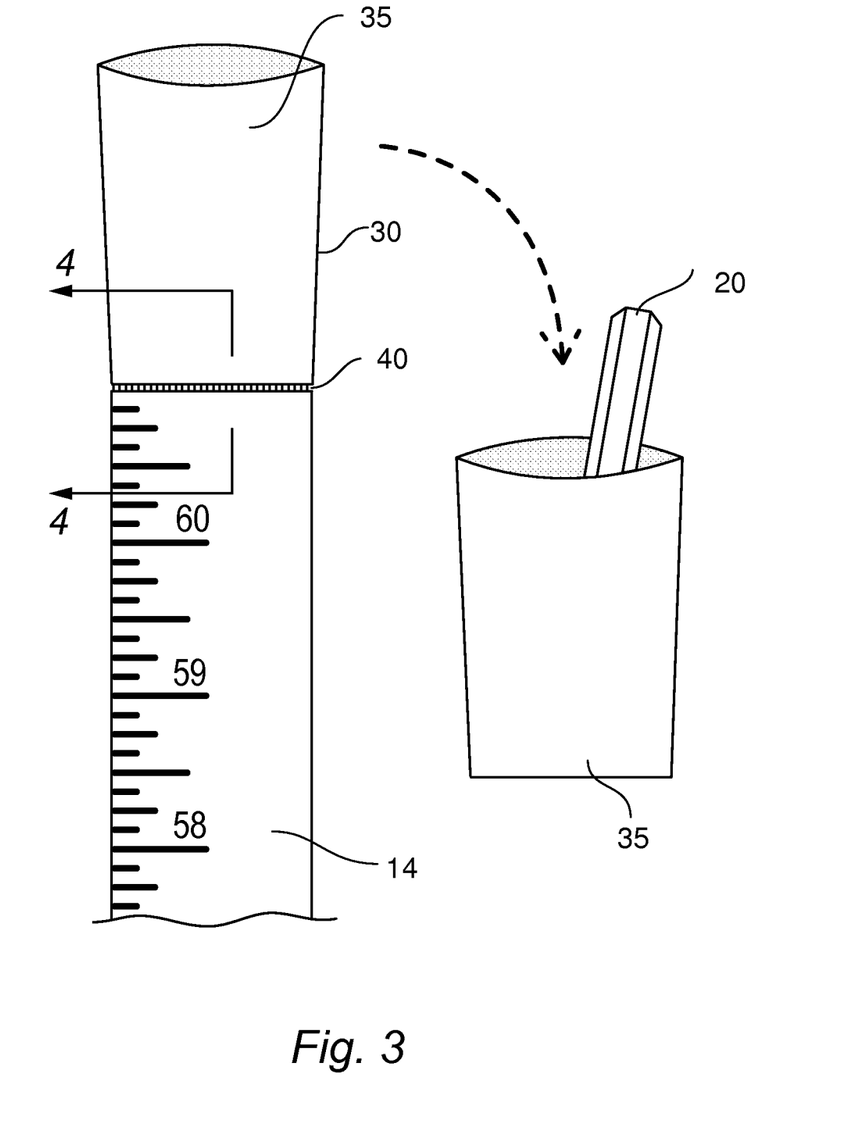
FIG. 3 shows one end of the adhesive backed flexible backing.

FIGS. 2 and 3 are perspective views illustrating the adhesive-backed flexible backing of the invention mounted on a wall. The figures illustrates the pocket positioned in tandem with an end of the measuring tape, the arrows showing the pocket before and after detachment from the end of the measuring tape. The pocket's outer adhesive surface achieves a purchase so that it is mounted on the wall in proximity to the measuring tape. A marking instrument (e.g. pencil) 20 is positioned in the pocket 35.

Figure 4:
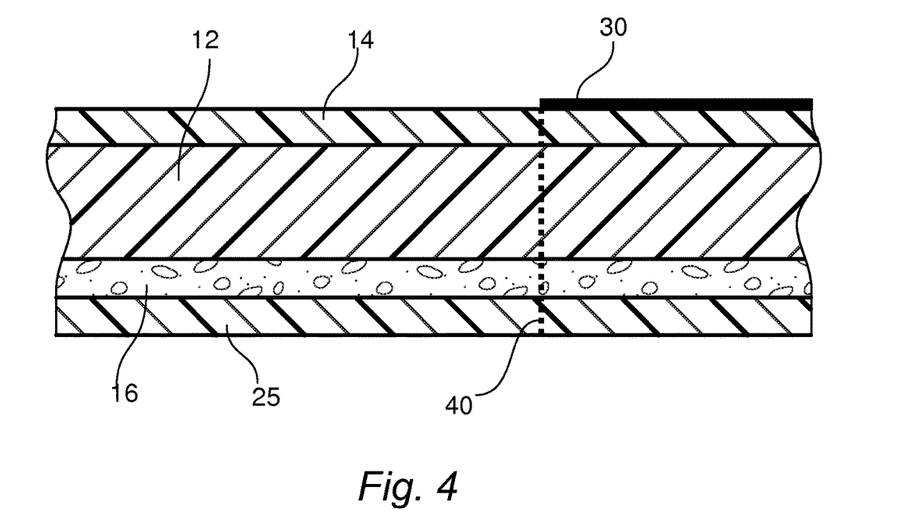
FIG. 4 is a section taken through plane 4-4 of FIG. 3.

FIG. 4 is a side cross section taken along axis 4-4 of FIG. 3.

In certain embodiments, the adhesive-backed flexible backing may be formed as discreet or individual units or sections. Alternately, the adhesive-backed flexible backing may also be formed as sections or units which are part of a larger roll stock the formation of which is well known to those of skill in the art.

The design and operation of such machines for manufacturing such adhesive tape stock are well known to those of skill in the art.

Method of Measuring Height Using the Adhesive Backed Flexible Backing of the Invention Have the child stand with feet flat, together, and back against the measuring tape of the adhesive backed flexible backing or against the wall in proximity to the tape.

While the child stands with head, shoulders, buttocks, and heels touching the adhesive measuring tape mounted on the wall, at the elevation of the crown of the head, mark on a space on the tape where the crown of the head meets the adhesive measuring tape. Then read the height measurement as the marked measurement on the adhesive measuring tape.

An adhesive-backed flexible backing which comprises an adhesive backed measuring tape is disclosed that can provide customized printed indicia on a single flexible backing that has a positionable or repositionable adhesive for contact with flat surfaces, single curved surfaces, or compound curved surfaces, and having a receptacle in tandem comprising at least in part a pocket or sleeve formed therein.

An embodiment of the invention includes a kit or combination which comprises the measuring tape of the invention and a marking instrument packaged or otherwise provided therein. Another embodiment of the combination comprises an extra length of release liner sized for mounting on the adhesive surface of the tape when it is removed from the wall. When the measuring tape is removed from a wall (e.g. for storage, or shipment) the extra length of release liner is mounted on the adhesive surface to avoid tangling of the measuring tape.

The measuring tapes of the present invention are repositionable. They leave no marks or other indicia 100 of damage on finished surfaces. Additionally, repositionable measuring tapes of the present invention are re-usable, thereby enhancing the ease of use of the embodiments of the present invention by allowing replacement in the event of error in placement in the first instance. Reusability also enhances the economy of the present invention.

What is claimed is:

1. A tape comprising:
   (a) a flexible backing comprising a front surface and a rear surface;
   (b) a measuring scale printed or contacted on said front surface;
   (c) an adhesive layer disposed on said rear surface; and
   (d) a receptacle which comprises an adhesive layer disposed on a rear or front surface of said receptacle, and is detachably positioned or disposed on one end of said tape and mountable on a substrate spaced from said tape,
wherein the other end of said tape comprises a display surface area sized for bearing indicia printed or contacted thereon, wherein the shape of said display surface is selected from the group of shapes consisting of quadrilaterals, triangles, polygons, circular, oval, round and curved, and combinations thereof.

2. The backing tape of claim 1 wherein said receptacle is a planar surface shaped and formatted with indicia for folding into a receptacle sized for receiving and holding a writing instrument.

3. A-flexible backing comprising:
   a. a front surface and a rear surface;
   b. a measuring scale printed or contacted on said front surface;
   c. a display surface disposed on one end of said backing;
   d. an adhesive layer disposed on said rear surface; and
   d. a receptacle which comprises an adhesive layer disposed on a rear or front surface of said receptacle, and is detachably positioned or disposed on one end of said flexible backing and mountable on a substrate spaced from said flexible backing,
wherein the shape of said display surface is selected from the group of shapes consisting of quadrilaterals, triangles, polygons, circular, oval, round and curved, and combinations thereof.

4. The backing of claim 3 wherein said receptacle is a planar surface shaped and formatted with indicia for folding into a receptacle sized for receiving and holding a writing instrument.

* * * * *